(12) United States Patent
Mikura et al.

(10) Patent No.: US 9,717,965 B2
(45) Date of Patent: Aug. 1, 2017

(54) GOLF CLUB GRIP AND GOLF CLUB

(71) Applicant: DUNLOP SPORTS CO., LTD., Kobe-shi, Hyogo (JP)

(72) Inventors: Chiemi Mikura, Kobe (JP); Sho Goji, Kobe (JP); Kazuyoshi Shiga, Kobe (JP); Kuniyasu Horiuchi, Kobe (JP); Toshiyuki Tarao, Kobe (JP); Hidetaka Inoue, Kobe (JP); Hitoshi Oyama, Kobe (JP); Hiroshi Hasegawa, Kobe (JP)

(73) Assignee: DUNLOP SPORTS CO. LTD, Kobe-Shi, Hyogo (JP)

( * ) Notice: Subject to any disclaimer, the term of this patent is extended or adjusted under 35 U.S.C. 154(b) by 0 days.

(21) Appl. No.: 14/708,487

(22) Filed: May 11, 2015

(65) Prior Publication Data
US 2015/0322245 A1 Nov. 12, 2015

(30) Foreign Application Priority Data

May 12, 2014 (JP) ................................ 2014-099089
May 12, 2014 (JP) ................................ 2014-099090
Aug. 13, 2014 (JP) ................................ 2014-164730

(51) Int. Cl.
*C08L 15/00* (2006.01)
*A63B 60/14* (2015.01)
(Continued)

(52) U.S. Cl.
CPC .............. *A63B 53/14* (2013.01); *A63B 60/14* (2015.10); *C08K 3/0016* (2013.01);
(Continued)

(58) Field of Classification Search
None
See application file for complete search history.

(56) References Cited

U.S. PATENT DOCUMENTS 5,300,569 A * 4/1994 Drake .................... C08C 19/28
525/207
6,093,767 A * 7/2000 Davis .................... C08L 21/00
428/1.33

(Continued)

FOREIGN PATENT DOCUMENTS

JP 2003-260155 A 9/2003
JP 3701220 B2 9/2005
(Continued)

OTHER PUBLICATIONS

English translation of Japanese Notice of Reasons for Rejection for Japanese Application No. 2014-099090, mailed Aug. 2, 2016.
(Continued)

*Primary Examiner* — Peter A Salamon
(74) *Attorney, Agent, or Firm* — Birch, Stewart, Kolasch & Birch, LLP

(57) ABSTRACT

An object of the present invention is to provide a golf club grip excellent in grip performance in a wet condition. The present invention provides a golf club grip formed from a rubber composition comprising a base rubber and a cross-linking agent, wherein the base rubber comprises a hydrogenated acrylonitrile-butadiene rubber and/or a carboxyl-modified acrylonitrile-butadiene rubber.

22 Claims, 1 Drawing Sheet

(51) Int. Cl.
*A63B 53/14* (2015.01)
*C08K 13/02* (2006.01)
*C08K 3/00* (2006.01)
*C08K 5/00* (2006.01)

(52) U.S. Cl.
CPC .......... *C08K 3/0033* (2013.01); *C08K 5/0025* (2013.01); *C08K 13/02* (2013.01); *A63B 2209/00* (2013.01)

(56) References Cited

U.S. PATENT DOCUMENTS

| | | | |
|---|---|---|---|
| 2003/0176577 A1* | 9/2003 | Sano | A63B 53/14 525/178 |
| 2005/0148727 A1* | 7/2005 | Ajbani | C08L 53/005 525/63 |
| 2006/0128894 A1* | 6/2006 | Nasreddine | C08K 5/14 525/178 |
| 2011/0165958 A1* | 7/2011 | Hachiro | A63B 53/14 473/300 |

FOREIGN PATENT DOCUMENTS

| | | |
|---|---|---|
| JP | 2006-169523 A | 6/2006 |
| JP | 2009-112500 A | 5/2009 |
| JP | 2010-94296 A | 4/2010 |
| JP | 2010-154979 A | 7/2010 |
| JP | 2011-10669 A | 1/2011 |

OTHER PUBLICATIONS

English translation of Japanese Notice of Reasons for Rejection for Japanese Application No. 2014-164730, mailed Aug. 2, 2016.

* cited by examiner

GOLF CLUB GRIP AND GOLF CLUB

FIELD OF THE INVENTION

The present invention relates to a golf club grip.

DESCRIPTION OF THE RELATED ART

As a grip installed on a golf club, a rubber-made grip is widely utilized. As such a rubber-made grip, for example, Japanese patent No. 3701220 B discloses a golf club grip formed by crosslinking a rubber composition, wherein a base polymer of the rubber composition comprises an acrylonitrile-butadiene rubber having a glass transition point ranging from −40° C. or more and −13° C. or less, and a ratio of the acrylonitrile-butadiene rubber in the total base polymer is 45 mass % or more, and wherein a peak temperature of a loss coefficient curve of the grip is −29° C. or more and 0° C. or less, which is measured with a viscoelastic spectrometer under conditions of initial strain of 10%, amplitude of ±2%, frequency of 10 Hz, start temperature of −100° C., finish temperature of 100° C., temperature elevating speed of 3° C./min, and a deformation mode of tension (refer to claim 4 of Japanese patent No. 3701220 B).

Generally, the golf club grip is formed in a cylindrical shape, and the grip is installed on the shaft by pushing the end of the shaft into the internal diameter of the grip. Because the tensile stress is applied on the grip when installing the grip on the shaft like this, the grip is required to have a mechanical strength. In the conventional rubber-made grip, a reinforcing material such as carbon black and silica is blended into the rubber composition to increase the mechanical strength.

SUMMARY OF THE INVENTION

One aspect of the present invention is to provide a golf club grip formed from a rubber composition comprising a base rubber and a crosslinking agent, wherein the base rubber comprises a hydrogenated acrylonitrile-butadiene rubber. If the hydrogenated acrylonitrile-butadiene rubber is used as the base rubber, tensile strength can be improved while the grip performance in a wet condition is maintained to the same extent that an acrylonitrile-butadiene rubber is used.

Another aspect of the present invention is to provide a golf club grip formed from a rubber composition comprising a base rubber and a crosslinking agent, wherein the base rubber comprises a carboxyl-modified acrylonitrile-butadiene rubber. If the carboxyl-modified acrylonitrile-butadiene rubber is used as the base rubber, the abrasion resistance can be improved while the grip performance in a wet condition is maintained to the same extent that an acrylonitrile-butadiene rubber is used.

DESCRIPTION OF THE PREFERRED EMBODIMENT

Figure 1:
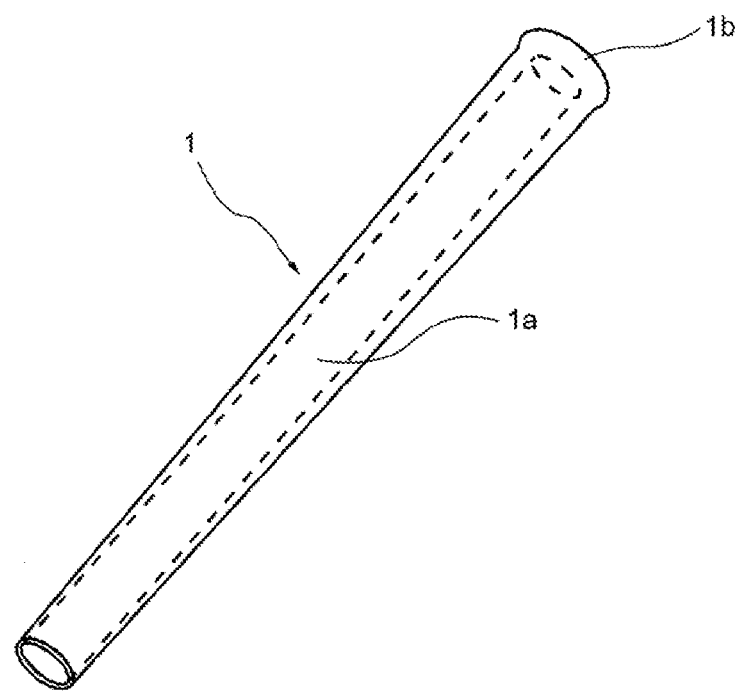
FIG. 1 is a perspective view showing one example of the golf club grip according to the present invention.

The golf club grip according to the present invention is formed from a rubber composition comprising a base rubber and a crosslinking agent. Hereinafter, the rubber composition used for the golf club grip will be explained.

In the first embodiment, the hydrogenated acrylonitrile-butadiene rubber is used as the base rubber. That is, the rubber composition (hereinafter also referred to as "first rubber composition") used in the first embodiment comprises the base rubber comprising the hydrogenated acrylonitrile-butadiene rubber, and the crosslinking agent. The hydrogenated acrylonitrile-butadiene rubber is a hydrogenated product of an acrylonitrile-butadiene rubber. If the hydrogenated acrylonitrile-butadiene rubber is used, tensile strength of the grip can be improved while the grip performance in a wet condition is maintained.

The content of acrylonitrile in the hydrogenated acrylonitrile-butadiene rubber is preferably 15 mass % or more, more preferably 18 mass % or more, even more preferably 20 mass % or more, and particularly preferably 21 mass % or more, and is preferably 50 mass % or less, more preferably 45 mass % or less, and even more preferably 40 mass % or less. If the content of acrylonitrile is 15 mass % or more, tensile strength of the grip becomes better, and if the content of acrylonitrile is 50 mass % or less, the grip in a cold district or winter season has a better touch feeling.

The content of double bond in the hydrogenated acrylonitrile-butadiene rubber is preferably 0.09 mmol/g or more, and more preferably 0.2 mmol/g or more, and is preferably 2.5 mmol/g or less, more preferably 2.2 mmol/g or less, even more preferably 2.0 mmol/g or less, and particularly preferably 1.5 mmol/g or less. If the content of double bond is 0.09 mmol/g or more, vulcanization becomes easy when molding the grip, and tensile strength of the grip is further enhanced. In addition, if the content of double bond is 2.5 mmol/g or less, durability (weather resistance) and tensile strength of the grip become better. The content of double bond can be adjusted by the content of butadiene in the copolymer or the amount of hydrogen added to the copolymer.

As the hydrogenated acrylonitrile-butadiene rubber, only a hydrogenated product of a copolymer composed of acrylonitrile and butadiene may be used, or a hydrogenated product of a copolymer comprising another monomer than acrylonitrile and butadiene may be also used. For example, a hydrogenated product of a copolymer of a monomer having a carboxyl group, acrylonitrile and butadiene can be used. Examples of the monomer having the carboxyl group include acrylic acid, methacrylic acid, fumaric acid, and maleic acid.

In the case where the hydrogenated product of the copolymer of the monomer having the carboxyl group, acrylonitrile and butadiene is used, the content of the monomer having the carboxyl group in the copolymer is preferably 1 mass % or more, more preferably 2 mass % or more, and even more preferably 3.5 mass % or more, and is preferably 30 mass % or less, more preferably 25 mass % or less, and even more preferably 20 mass % or less. If the content of the monomer having the carboxyl group is 1 mass % or more, the abrasion resistance becomes high and thus the durability of the grip enhances, and if the content of the monomer having the carboxyl group is 30 mass % or less, the grip has a better touch feeling in a cold district or winter season.

In the case where the hydrogenated product of the copolymer of the monomer having the carboxyl group, acrylonitrile and butadiene is used, the content of the carboxyl group in the copolymer is preferably 1 mass % or more, more preferably 2 mass % or more, and even more preferably 3.5 mass % or more, and is preferably 30 mass % or less, more preferably 25 mass % or less, and even more preferably 20 mass % or less. If the content of the carboxyl group is 1 mass % or more, the abrasion resistance becomes high and thus the durability of the grip enhances, and if the content of the carboxyl group is 30 mass % or less, the grip has a better touch feeling in a cold district or winter season.

As the hydrogenated acrylonitrile-butadiene rubber, a commercially available product can be used. Examples of such hydrogenated acrylonitrile-butadiene rubber include: Therban (registered trademark) 3406, Therban 3407, Therban 3607, Therban 3907, Therban 4307, Therban 4309, Therban 3446, Therban 3467, Therban 3496, Therban 3627, Therban 3629, Therban 3668VP, Therban 4367, Therban 4369, Therban LT2157, Therban LT2007, Therban LT2057, Therban LT2568, Therban AT3404, Therban AT3443VP, Therban AT3904VP, Therban AT4364VP, Therban AT5005VP, Therban AT LT 2004VP, Therban XT KA, and 8889VP, which are commercially available from Lanxess Corporation; and Zetpol (registered trademark) 0020, Zetpol 1000L, Zetpol 1010, Zetpol 1020, Zetpol 2000, Zetpol 2010, Zetpol 2011, Zetpol 2020, Zetpol 3300, Zetpol 3310, Zetpol 4300, Zetpol 4310, and Zetpol 4320, which are commercially available from Japan Zeon Corporation.

The first rubber composition may comprise another rubber component in addition to the hydrogenated acrylonitrile-butadiene rubber as the base rubber. Examples of the other rubber components include an acrylonitrile-butadiene rubber, a carboxyl-modified acrylonitrile-butadiene rubber, an isoprene rubber, a butadiene rubber, a styrene-butadiene rubber, an ethylene-propylene-diene rubber, a chloroprene rubber, a butyl rubber, an acrylic rubber, a urethane rubber, an epichlorohydrin rubber, a polysulfide rubber, and a natural rubber. The content of the hydrogenated acrylonitrile-butadiene rubber in the base rubber is preferably 50 mass % or more, more preferably 60 mass % or more, and even more preferably 70 mass % or more. It is also preferable to use only the hydrogenated acrylonitrile-butadiene rubber as the base rubber.

In the second embodiment, the carboxyl-modified acrylonitrile-butadiene rubber is used as the base rubber. That is, the rubber composition (hereinafter also referred to as "second rubber composition") used in the second embodiment comprises the base rubber comprising the carboxyl-modified acrylonitrile-butadiene rubber, and the crosslinking agent. The carboxyl-modified acrylonitrile-butadiene rubber is a copolymer of a monomer having a carboxyl group, acrylonitrile and butadiene. Examples of the monomer having the carboxyl group include acrylic acid, methacrylic acid, fumaric acid, and maleic acid. If the carboxyl-modified acrylonitrile-butadiene rubber is used, the abrasion resistance of the grip can be improved while the grip performance in a wet condition is maintained.

The content of acrylonitrile in the carboxyl-modified acrylonitrile-butadiene rubber is preferably 15 mass % or more, more preferably 18 mass % or more, and even more preferably 21 mass % or more, and is preferably 50 mass % or less, more preferably 45 mass % or less, and even more preferably 40 mass % or less. If the content of acrylonitrile is 15 mass % or more, the abrasion resistance of the grip becomes better, and if the content of acrylonitrile is 50 mass % or less, the grip has a better touch feeling in a cold district or winter season.

The content of the monomer having the carboxyl group in the carboxyl-modified acrylonitrile-butadiene rubber is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the content of the monomer having the carboxyl group is 1.0 mass % or more, abrasion resistance becomes better, and if the content of the monomer having the carboxyl group is 30 mass % or less, the grip has a better touch feeling in a cold district or winter season.

The content of the carboxyl group in the carboxyl-modified acrylonitrile-butadiene rubber is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the content of the carboxyl group is 1.0 mass % or more, abrasion resistance becomes better, and if the content of the carboxyl group is 30 mass % or less, the grip has a better touch feeling in a cold district or winter season.

As the carboxyl-modified acrylonitrile-butadiene rubber, a hydrogenated carboxyl-modified acrylonitrile-butadiene rubber, in which part of double bond in the molecule has been hydrogenated, may be used. In this case, the content of double bond in the hydrogenated carboxyl-modified acrylonitrile-butadiene rubber is preferably 0.09 mmol/g or more, and more preferably 0.2 mmol/g or more, and is preferably 2.5 mmol/g or less, more preferably 2.0 mmol/g or less, and even more preferably 1.5 mmol/g or less. If the content of double bond is 0.09 mmol/g or more, vulcanization becomes easy when molding the grip, and if the content of double bond is 2.5 mmol/g or less, lowering in weather resistance can be suppressed. The content of double bond can be adjusted by the content of butadiene in the copolymer or the amount of hydrogen added to the copolymer.

As the carboxyl-modified acrylonitrile-butadiene rubber, a commercially available product can be used. Examples of such carboxyl-modified acrylonitrile-butadiene rubbers include Krynac (registered trademark) X146, Krynac X160, Krynac X740, and Krynac X750, which are commercially available from Lanxess Corporation; and Zetpol (registered trademark) 1072J, Zetpol DN631, and Zetpol NX775, which are commercially available from Japan Zeon Corporation. In addition, examples of the hydrogenated carboxyl-modified acrylonitrile-butadiene rubber include Therban (registered trademark) XT KA 8889VP commercially available from Lanxess Corporation.

The base rubber may comprise another rubber component in addition to the carboxyl-modified acrylonitrile-butadiene rubber. Examples of the other rubber components include an acrylonitrile-butadiene rubber, a hydrogenated acrylonitrile-butadiene rubber, an isoprene rubber, a butadiene rubber, a styrene-butadiene rubber, an ethylene-propylene-diene rubber, a chloroprene rubber, a butyl rubber, an acrylic rubber, a urethane rubber, an epichlorohydrin rubber, a polysulfide rubber, and a natural rubber. The content of the carboxyl-modified acrylonitrile-butadiene rubber in the base rubber is preferably 60 mass % or more, more preferably 70 mass % or more, and even more preferably 80 mass % or more. It is also preferable to use only the carboxyl-modified acrylonitrile-butadiene rubber as the base rubber.

As the crosslinking agent comprised in the first rubber composition and the second rubber composition, a sulfur-based crosslinking agent or an organic peroxide can be used. Examples of the sulfur-based crosslinking agent include an elemental sulfur and a sulfur donor type compound. Examples of the elemental sulfur include a powdery sulfur, a precipitated sulfur, a colloidal sulfur, and an insoluble sulfur. Examples of the sulfur donor type compound include 4,4'-dithiobismorpholine. Examples of the organic peroxide include dicumyl peroxide, α,α'-bis(t-butylperoxy-m-diisopropyl)benzene, 2,5-dimethyl-2,5-di(t-butylperoxy) hexane, and 1,1-bis(t-butylperoxy)-3,3,5-trimethylcyclohexane. The crosslinking agent may be used solely, or two or more of them may be used in combination. As the crosslinking agent, the sulfur-based crosslinking agent is preferable, and the elemental sulfur is more preferable. The amount of the crosslinking agent is preferably 0.2 part by mass or more, more preferably 0.4 part by mass or more, and even more preferably 0.6 part by mass or more, and is preferably 4.0 parts by mass or less, more preferably 3.5 parts by mass or less, and even more preferably 3.0 parts by mass or less with respect to 100 parts by mass of the base rubber.

The rubber composition preferably comprises a metal compound in addition to the base rubber and the crosslinking agent. If the metal compound is comprised, a metal crosslinking can be formed between the carboxyl groups of the carboxyl-modified acrylonitrile-butadiene rubber. Examples of the metal compound include a metal oxide, a metal peroxide, a metal hydroxide, and a metal carbonate. Examples of the metal oxide include zinc oxide, magnesium oxide, calcium oxide, copper oxide, and lead oxide. Examples of the metal peroxide include zinc peroxide, chromium peroxide, magnesium peroxide, and calcium peroxide. Examples of the metal hydroxide include magnesium hydroxide, zinc hydroxide, calcium hydroxide, sodium hydroxide, lithium hydroxide, potassium hydroxide, and copper hydroxide. Examples of the metal carbonate include magnesium carbonate, zinc carbonate, calcium carbonate, sodium carbonate, lithium carbonate, and potassium carbonate. As the metal compound, a divalent metal compound is preferable, and a zinc compound is more preferable. These metal compounds may be used solely, or two or more of them may be used in combination.

The amount of the metal compound is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less with respect to 100 parts by mass of the base rubber.

The first rubber composition and the second rubber composition preferably comprise a vulcanization accelerator and a vulcanization activator, in addition to the base rubber and the crosslinking agent.

Examples of the vulcanization accelerator include thiurams such as tetramethylthiuram disulfide, tetrabenzylthiuram disulfide, tetramethylthiuram monosulfide, dipentamethylenethiuram tetrasulfide and the like; guanidines such as diphenylguanidine and the like; dithiocarbamates such as zinc dibutyldithiocarbamate and the like; thioureas such as trimethylthiourea, N,N'-diethylthiourea and the like; thiazoles such as mercaptobenzothiazole, benzothiazole disulfide and the like; and sulfenamides such as N-cyclohexyl-2-benzothiazolylsulfenamide and the like. These vulcanization accelerators may be used solely, or two or more of them may be used in combination.

The amount of the vulcanization accelerator is preferably 0.4 part by mass or more, more preferably 0.8 part by mass or more, and even more preferably 1.2 parts by mass or more, and is preferably 8.0 parts by mass or less, more preferably 7.0 parts by mass or less, and even more preferably 6.0 parts by mass or less with respect to 100 parts by mass of the base rubber.

Examples of the vulcanization activator include a metal oxide, a metal peroxide, and a fatty acid. Examples of the metal oxide include zinc oxide, magnesium oxide, and lead oxide. Examples of the metal peroxide include zinc peroxide; chromium peroxide, magnesium peroxide, and calcium peroxide. Examples of the fatty acid include stearic acid, oleic acid, and palmitic acid. These vulcanization activators may be used solely, or two or more of them may be used in combination. In addition, in the case that the hydrogenated acrylonitrile-butadiene rubber has a carboxyl group in the molecule thereof, the metal peroxide is preferably comprised as the vulcanization activator.

The amount of the vulcanization activator is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less with respect to 100 parts by mass of the base rubber.

The rubber composition may further comprise a reinforcing material, an antioxidant, a softening agent, a coloring agent and the like where necessary.

Examples of the reinforcing material include carbon black, silica, calcium carbonate, titanium oxide and clay. The amount of the reinforcing material is 0 part by mass ore more, preferably 2.0 parts by mass or more, more preferably 3.0 parts by mass or more, and even more preferably 4.0 parts by mass or more, and is preferably 50 parts by mass or less, more preferably 45 parts by mass or less, and even more preferably 40 parts by mass or less with respect to 100 parts by mass of the base rubber.

Examples of the antioxidant include imidazoles, amines, phenols, and thioureas. Examples of the imidazoles include nickel dibutyldithiocarbamate, 2-mercaptobenzimidazole, and zinc salt of 2-mercaptobenzimidazole. Examples of the amines include phenyl-α-naphtylamine and the like. Examples of the phenols include 2,6-di-tert-butyl-4-methylphenol. Examples of the thioureas include tributylthiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, and even more preferably 0.4 part by mass or more, and is preferably 5.0 parts by mass or less, more preferably 4.8 parts by mass or less, and even more preferably 4.6 parts by mass or less with respect to 100 parts by mass of the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

The first rubber composition and the second rubber composition can be prepared by a conventionally known method, for example, a method of using a kneading machine such as Banbury mixer, kneader, open roll and the like to knead raw materials. The temperature (material temperature) for kneading preferably ranges from 90° C. to 160° C.

The shape of the golf club grip according to the present invention is not particularly limited, and a conventionally known shape can be employed. Examples of the shape of the grip include a shape having a cylindrical part for inserting a shaft and an integrally molded cap part for covering the opening of the back end of the cylindrical part. The thickness of the cylindrical part may be kept fixed along the axis direction, or may gradually become thicker from the front end toward the back end. In addition, the thickness of the cylindrical part may be constant along the radial direction, or a projection part (so-called back line) may be partly formed. Furthermore, a groove may be formed on the surface of the cylindrical part. Formation of a water film between the hand of the golfer and the grip may be suppressed by grooves, thus the grip performance in a wet condition is further enhanced. In addition, in view of anti-slip performance and abrasion resistance of the grip, a reinforcing cord may be arranged in the grip.

The golf club grip is obtained by molding the rubber composition in a mold. Examples of the molding method include press molding and injection molding. In the case of utilizing press molding, the temperature of the mold is preferably from 140° C. to 200° C., the molding time is preferably from 5 minutes to 45 minutes, and the molding pressure is preferably from 0.1 MPa to 100 MPa.

The golf club according to the present invention comprises a shaft, a head provided on one end of the shaft, and a grip provided on another end of the shaft, wherein the grip is formed from the above-described rubber composition. The shaft can be made of stainless steel or a carbon fiber reinforcing resin. Examples of the head include wood type, utility type, and iron type. The material constituting the head is not particularly limited, and examples thereof include titanium, a titanium alloy, a carbon fiber reinforcing plastic, stainless steel, maraging steel, and soft iron.

Next, the golf club grip and the golf club according to the present invention will be explained with reference to figures. FIG. 1 is a perspective view showing one example of the golf club grip according to the present invention. A grip 1 comprises a cylindrical part 1a into which a shaft is inserted and an integrally molded cap part 1b for covering the opening of the back end of the cylindrical part. The thickness of the cylindrical part 1a gradually becomes thick from the front end toward the back end.

Figure 2:
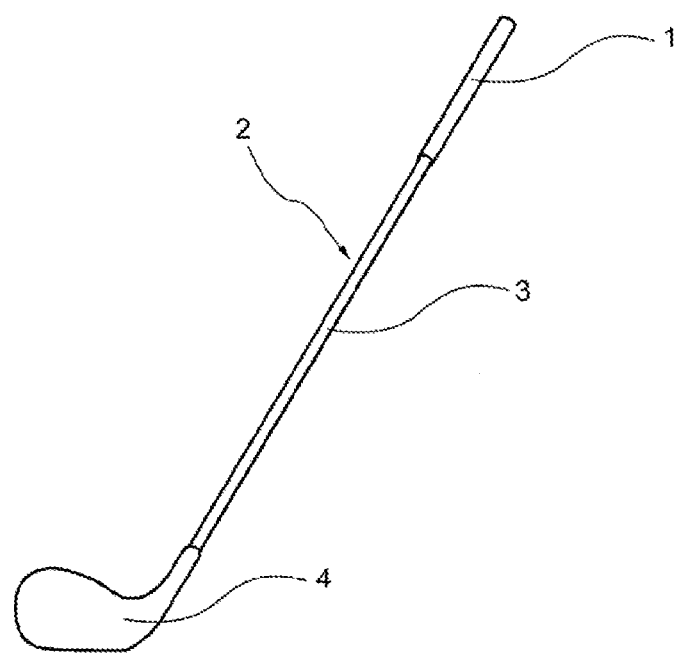
FIG. 2 is a perspective view showing one example of the golf club according to the present invention.

FIG. 2 is a perspective view showing one example of the golf club according to the present invention. A golf club 2 comprises a shaft 3, a head 4 provided on one end of the shaft 3, and a grip 1 provided on another end of the shaft 3. The back end of the shaft 3 is inserted into the cylindrical part 1a of the grip 1.

EXAMPLES

Hereinafter, the present invention will be described in detail by way of examples. The present invention is not limited to the examples described below. Various changes and modifications can be made without departing from the spirit and scope of the present invention.

[Evaluation Method]

(1) Content of Acrylonitrile

The content of acrylonitrile in the acrylonitrile-butadiene rubber before hydrogenation is measured according to ISO 24698-1 (2008).

(2) Content of Double Bond (mmol/g)

The content of double bond is calculated from the content (mass %) of butadiene in the copolymer and the amount (%) of residual double bond. The amount of residual double bond is a mass ratio (amount of double bond after hydrogenation/amount of double bond before hydrogenation) of double bond in the copolymer after hydrogenation to double bond in the copolymer before hydrogenation, and can be measured with infrared spectroscopy. In the case that the acrylonitrile-butadiene rubber is an acrylonitrile-butadiene binary copolymer, the content of butadiene in the copolymer is calculated by subtracting the content (mass %) of acrylonitrile from 100.

$$\text{Content of double bond} = \{\text{content of butadiene}/45\} \times \text{amount of residual double bond} \times 10$$

(3) Content of Monomer Having Carboxyl Group 1 g of the hydrogenated acrylonitrile-butadiene rubber was weighted and dissolved in 50 ml of chloroform, thymol blue indicator was dripped therein. 0.05 mol/L sodium hydroxide methanol solution was dripped into the solution while stirring the solution, and the dripping amount (V ml) at the time the solution color initially changed was recorded. Regarding 50 ml of chloroform solution not containing the hydrogenated acrylonitrile-butadiene rubber, which was used as the blank, thymol blue was used as the indicator, 0.05 mol/L sodium hydroxide methanol solution was dripped into the solution, and the dripping amount (B ml) at the time the solution color initially changed was recorded. The content of the monomer having the carboxyl group is calculated according to the following formula.

$$\text{Content of monomer having carboxyl group} = \{0.05 \times (V-B) \times PM\}/(10 \times X)$$

(In the formula, V: dripping amount (ml) of test sodium hydroxide solution, B: dripping amount (ml) of blank sodium hydroxide solution, PM: molecular weight of monomer having carboxyl group, X: valence of monomer having carboxyl group)

(4) Tensile Strength

Tensile strength was measured according to JIS K 6251 (2010). In detail, a sheet with a thickness of 2 mm was prepared by pressing molding (molding temperature: 160° C., molding time: 15 minutes) the rubber composition. The sheet was punched into a dumbbell shape (Dumbbell No. 3) to prepare a test piece, and physical properties of the test piece were measured (measurement temperature: 23° C., tensile speed: 500 mm/min) using a tensile test measurement apparatus (Autograph AGS-D manufactured by SHIMADZU Corporation). Then, tensile strength was calculated by dividing greatest tensile force recorded until the test piece was broken by the initial cross-sectional area of the test piece. It is noted that tensile strength of the grip No. 1 was defined as an index of 100, and tensile strength of each grip is represented as an index by converting tensile strength into this index.

(5) Grip Performance in Wet Condition

The grip was provided on the shaft to obtain a golf club. The grip was wetted with water for a wet condition, and ten golfers used the golf club to evaluate anti-slip performance, which has five-grades from "1" to "5". The grip that is the most difficult to slip is graded as "5", and the grip that is the easiest to slip is graded as "1". Evaluation values of ten golfers for each grip were averaged, anti-slip performance of the grip No. 1 was defined as an index of 100, and anti-slip performance of each grip is represented as an index by converting anti-slip performance into this index.

(6) Abrasion Resistance

Abrasion resistance was evaluated using a Gakushin type abrasion tester (FR-2 manufactured by Suga Test Instruments Co., Ltd). In detail, a sheet with a thickness of 2 mm was prepared by pressing molding (molding temperature: 160° C., molding time: 15 minutes) the rubber composition. The sheet was punched into a rectangular shape with a length of 130 mm and a width of 35 mm to prepare a test piece, and the test piece was fixed on a test piece table. A sand paper (240 count) was provided on the front end of a friction arm, and the test piece was rubbed for a reciprocating distance of 100 mm at the central part of the test piece 500 times at a reciprocating speed of 30 times per minute under a load of 2N. Then, abrasion resistance was evaluated by the mass change of the test piece before and after the test. It is noted that abrasion resistance of the grip No. 1 was defined as an index of 100, and abrasion resistance of each grip is represented as an index by converting abrasion resistance into this index.

[Production of Grip]

Materials according to the formulations shown in Tables 1, 2 were mixed and kneaded with Banbury mixer (material temperature: 150° C.) to prepare the rubber compositions. The obtained rubber compositions were charged into molds having a groove pattern on the cavity surface thereof. Then, heat treatment was carried out at a mold temperature of 160° C. for a heating time of 15 minutes to obtain the golf club grip. The evaluation results for each grip are shown in Tables 1, 2.

TABLE 1

| | Grip No. | | 1 | 2 | 3 | 4 | 5 | 6 | 7 | 8 | 9 | 10 | 11 | 12 |
|---|---|---|---|---|---|---|---|---|---|---|---|---|---|---|
| Formulation (parts by mass) | Base rubber | NBR | 100 | 100 | 100 | — | — | — | — | — | — | — | — | — |
| | | HNBR1 | — | — | — | 100 | — | — | — | — | — | — | — | — |
| | | HNBR2 | — | — | — | — | 100 | — | — | — | — | — | — | — |
| | | HNBR3 | — | — | — | — | — | 100 | — | — | — | — | — | — |
| | | HXNBR | — | — | — | — | — | — | 100 | — | — | — | — | 100 |
| | | HNBR4 | — | — | — | — | — | — | — | 100 | — | — | — | — |
| | | HNBR5 | — | — | — | — | — | — | — | — | 100 | — | — | — |
| | | HNBR6 | — | — | — | — | — | — | — | — | — | 100 | — | — |
| | | HNBR7 | — | — | — | — | — | — | — | — | — | — | 100 | — |
| | Crosslinking agent | Sulfur | 1.5 | 1.5 | 1.5 | 1.5 | 1.5 | 1.5 | 1.5 | 1.5 | 1.5 | 1.5 | 1.5 | 1.5 |
| | Vulcanization accelerator | TMTD | 3 | 3 | 3 | 3 | 3 | 3 | 3 | 3 | 3 | 3 | 3 | — |
| | | TBzTD | — | — | — | — | — | — | — | — | — | — | — | 3 |
| | Vulcanization activator | Zinc oxide | 5 | 5 | 5 | 5 | 5 | 5 | — | — | — | — | — | — |
| | | Zinc peroxide (1) | — | — | — | — | — | — | 5 | 5 | 5 | 5 | 5 | — |
| | | Zinc peroxide (2) | — | — | — | — | — | — | — | — | — | — | — | 5 |
| | | Stearic acid | 2 | 2 | 2 | 2 | 2 | 2 | 2 | 2 | 2 | 2 | 2 | 2 |
| | Reinforcing agent | Carbon black | 5 | 10 | 30 | 5 | 5 | 5 | 5 | 5 | 5 | 5 | 5 | 5 |
| | Antioxidant | NDIBC | 1.5 | 1.5 | 1.5 | 1.5 | 1.5 | 1.5 | 1.5 | 1.5 | 1.5 | 1.5 | 1.5 | — |
| | | TBTU | — | — | — | — | — | — | — | — | — | — | — | 1.0 |
| Acrylonitrile-butadiene rubber | Content of acrylonitrile (mass %) | | 33.0 | 33.0 | 33.0 | 36.0 | 34.0 | 36.0 | 33.0 | 21.0 | 43.0 | 49.0 | 34.0 | 33.0 |
| | Content of double bond (mmol/g) | | 12.4 | 12.4 | 12.4 | 0.24 | 0.49 | 0.71 | 0.40 | 0.80 | 0.58 | 0.09 | 2.20 | 0.40 |
| Tensile strength | | | 100 | 135 | 298 | 1006 | 710 | 413 | 784 | 153 | 983 | 401 | 143 | 771 |
| Grip performance in wet condition | | | 100 | 106 | 105 | 97 | 91 | 90 | 93 | 92 | 92 | 91 | 93 | 93 |
| Abrasion resistance | | | 100 | 155 | 141 | — | — | — | 425 | — | — | — | — | — |

TABLE 2

| | Grip No. | | 1 | 2 | 3 | 13 | 14 | 15 |
|---|---|---|---|---|---|---|---|---|
| Formulation (parts by mass) | Base rubber | NBR | 100 | 100 | 100 | — | — | — |
| | | XNBR1 | — | — | — | 100 | — | — |
| | | XNBR2 | — | — | — | — | 100 | — |
| | | HXNBR | — | — | — | — | — | 100 |
| | Crosslinking agent | Sulfur | 1.5 | 1.5 | 1.5 | 1.5 | 1.5 | 1.5 |
| | Vulcanization accelerator | TMTD | 3 | 3 | 3 | 3 | 3 | 3 |
| | Metal compound | Zinc oxide | 5 | 5 | 5 | — | — | — |
| | | Zinc peroxide (1) | — | — | — | 5 | 5 | 5 |
| | Vulcanization activator | Stearic acid | 2 | 2 | 2 | 2 | 2 | 2 |
| | Reinforcing agent | Carbon black | 5 | 10 | 30 | 5 | 5 | 5 |
| | Antioxidant | NDIBC | 1.5 | 1.5 | 1.5 | 1.5 | 1.5 | 1.5 |
| Acrylonitrile-butadiene rubber | Content of acrylonitrile (mass %) | | 33.0 | 33.0 | 33.0 | 32.5 | 27.0 | 33.0 |
| | Content of monomer having carboxyl group (mass %) | | 0 | 0 | 0 | 0.4 | 7.5 | 5.0 |
| | Content of double bond (mmol/g) | | 12.4 | 12.4 | 12.4 | — | — | 0.40 |

TABLE 2-continued

| Grip No. | 1 | 2 | 3 | 13 | 14 | 15 |
|---|---|---|---|---|---|---|
| Abrasion resistance | 100 | 155 | 141 | 66 | 954 | 425 |
| Coefficient of dynamic friction in wet condition | 100 | 106 | 105 | 98 | 98 | 93 |
| Tensile strength | 100 | 135 | 298 | — | — | 784 |

Materials used in Tables 1, 2 are shown as follows.

NBR: acrylonitrile-butadiene rubber (manufactured by Lanxess Corporation, Krynac (registered trademark) 3345F (content of acrylonitrile: 33.0 mass %))

HNBR1: hydrogenated acrylonitrile-butadiene rubber (manufactured by Lanxess Corporation, Therban (registered trademark) 3629 (amount of residual double bond: 2.0%, content of acrylonitrile: 36.0 mass %))

HNBR2: hydrogenated acrylonitrile-butadiene rubber (manufactured by Lanxess Corporation, Therban 3446 (amount of residual double bond: 4.0%, content of acrylonitrile: 34.0 mass %))

HNBR3: hydrogenated acrylonitrile-butadiene rubber (manufactured by Lanxess Corporation, Therban 3668 VP (amount of residual double bond: 6.0%, content of acrylonitrile: 36.0 mass %))

HXNBR: hydrogenated carboxyl-modified acrylonitrile-butadiene rubber (manufactured by Lanxess Corporation, Therban XT VPKA 8889 (amount of residual double bond: 3.5%, content of acrylonitrile: 33.0 mass %, content of monomer having a carboxyl group: 5.0 mass %))

HNBR4: hydrogenated acrylonitrile-butadiene rubber (manufactured by Lanxess Corporation, Therban LT2057 (amount of residual double bond: 5.5%, content of acrylonitrile: 21.0 mass %))

HNBR5: hydrogenated acrylonitrile-butadiene rubber (manufactured by Lanxess Corporation, Therban 4369 (amount of residual double bond: 5.5%, content of acrylonitrile: 43.0 mass %))

HNBR6: hydrogenated acrylonitrile-butadiene rubber (manufactured by Lanxess Corporation, Therban AT 5005 VP (amount of residual double bond: 0.9%, content of acrylonitrile: 49.0 mass %))

HNBR7: hydrogenated acrylonitrile-butadiene rubber (manufactured by Lanxess Corporation, Therban 3496 (amount of residual double bond: 18.0%, content of acrylonitrile: 34.0 mass %))

XNBR1: carboxyl-modified acrylonitrile-butadiene rubber (manufactured by Lanxess Corporation, Krynac X146 (content of acrylonitrile: 32.5 mass %))

XNBR2: carboxyl-modified acrylonitrile-butadiene rubber (manufactured by Lanxess Corporation, Krynac X750 (content of acrylonitrile: 27.0 mass %))

Sulfur: 5% oil treated sulfur fine powder (200 mesh) manufactured by Tsurumi Chemical Industry Co., Ltd.

TMTD: tetramethylthiuram disulfide (Nocceler (registered trademark) TT-P manufactured by Ouchi Shinko Chemical Industry Co., Ltd.)

TBzTD: tetrabenzylthiuram disulfide (Nocceler TBzTD manufactured by Ouchi Shinko Chemical Industry Co., Ltd.)

Zinc oxide: Ginrei R manufactured by Toho Zinc Co., Ltd.

Zinc peroxide (1): manufactured by Sigma-Aldrich Corporation

Zinc peroxide (2): Struktol ZP 1014 (content of zinc peroxide: 29 mass %) manufactured by Struktol Company Stearic acid: beads stearic acid *camellia* manufactured by NOF Corporation.

Carbon black: SEAST SO (FEF) manufactured by Tokai Carbon Co., Ltd.

NDIBC: nickel dibutyldithiocarbamate (Noklac (registered trademark) NBC manufactured by Ouchi Shinko Chemical Industry Co., Ltd.)

TBTU: tributylthiourea (Noklac TBTU manufactured by Ouchi Shinko Chemical Industry Co., Ltd.)

Grips No. 1 to 3 are the cases where an acrylonitrile-butadiene rubber is used as the base rubber and the amounts of carbon black are changed. By comparing tensile strength of these grips, it can be seen that a larger quantity of carbon black provides higher tensile strength. Grips No. 4 to 12 are the cases where a hydrogenated acrylonitrile-butadiene rubber is used as the base rubber. By comparing tensile strength of grips No. 4 to 12 to tensile strength of grips No. 1 to 3, it can be seen that using a hydrogenated acrylonitrile-butadiene rubber provides higher improvement effect in tensile strength than increasing the amount of carbon black.

From the results of Grips No. 4, 6 and grips No. 5, 11, it is considered that when the content of acrylonitrile is fixed, a lower content of double bond provides higher tensile strength. Furthermore, from the results of grips No. 5, 6, 9, it is considered that a higher content of acrylonitrile provides higher tensile strength.

Grips No. 1 to 3 are the cases where an acrylonitrile-butadiene rubber is used as the base rubber and the amounts of carbon black are changed. By comparing abrasion resistance of these grips, it can be seen that although the grip No. 2 (carbon black: 10 parts by mass) exhibits higher abrasion resistance than the grip No. 1, the grip No. 3 (carbon black: 30 parts by mass) exhibits inferior abrasion resistance to the grip No. 2. Grips No. 13 to 15 are the cases where a carboxyl-modified acrylonitrile-butadiene rubber is used as the base rubber. By comparing abrasion resistance of grips No. 14, 15 to abrasion resistance of grips No. 1 to 3, it can be seen that using a carboxyl-modified acrylonitrile-butadiene rubber provides higher improvement effect in abrasion resistance than increasing the amount of carbon black.

This application is based on Japanese patent application No. 2014-099089 filed on May 12, 2014, Japanese patent application No. 2014-099090 filed on May 12, 2014, and Japanese patent application No. 2014-164730 filed on Aug. 13, 2014, the contents of which are hereby incorporated by reference.

The invention claimed is:

1. A golf club grip formed from a rubber composition comprising a base rubber and a crosslinking agent,
   wherein the base rubber consists essentially of a hydrogenated acrylonitrile-butadiene rubber and/or a carboxyl-modified acrylonitrile-butadiene rubber; or
   consists essentially of a hydrogenated acrylonitrile-butadiene rubber and/or a carboxyl-modified acrylonitrile-butadiene rubber, and at least one selected from the group consisting of an acrylonitrile-butadiene rubber, an isoprene rubber, a butadiene rubber, an ethylene-propylene-diene rubber, a chloroprene rubber, a butyl rubber, an acrylic rubber, a urethane rubber, an epichlorohydrin rubber, a polysulfide rubber and a natural rubber.

2. The golf club grip according to claim 1, wherein the hydrogenated acrylonitrile-butadiene rubber contains double bond in an amount ranging from 0.09 mmol/g to 2.5 mmol/g.

3. The golf club grip according to claim 2, wherein the hydrogenated acrylonitrile-butadiene rubber contains acrylonitrile in a content ranging from 15 mass % to 50 mass %.

4. The golf club grip according to claim 1, wherein the rubber composition comprises a reinforcing material in a content ranging from 0 part by mass to 50 parts by mass with respect to 100 parts by mass of the base rubber.

5. The golf club grip according to claim 4, wherein the reinforcing material is at least one member selected from the group consisting of carbon black, silica, calcium carbonate, titanium oxide, and clay.

6. The golf club grip according to claim 1, wherein the rubber composition comprises, as a vulcanization activator, at least one member selected from the group consisting of a metal oxide, a metal peroxide and a fatty acid.

7. The golf club grip according to claim 6, wherein the rubber composition comprises, as the vulcanization activator, the metal oxide and/or the metal peroxide, and the fatty acid.

8. The golf club grip according to claim 1, wherein the rubber composition comprises, as a vulcanization accelerator, at least one member selected from the group consisting of a thiuram type vulcanization accelerator, a guanidine type vulcanization accelerator, a dithiocarbamate type vulcanization accelerator, a thiourea type vulcanization accelerator, a thiazole type vulcanization accelerator, and a sulfenamide type vulcanization accelerator.

9. The golf club grip according to claim 1, wherein the hydrogenated acrylonitrile-butadiene rubber contains double bond in an amount ranging from 0.09 mmol/g to 2.5 mmol/g, and acrylonitrile in an amount ranging from 15 mass % to 50 mass %,
the rubber composition comprises carbon black in a content ranging from 2.0 parts by mass to 50 parts by mass with respect to 100 parts by mass of the base rubber, and
the rubber composition comprises, as a vulcanization activator, a metal oxide and/or a metal peroxide, and fatty acid.

10. The golf club grip according to claim 1, wherein the hydrogenated acrylonitrile-butadiene rubber is a hydrogenated product of a copolymer of a monomer having a carboxyl group, acrylonitrile and butadiene, and
the copolymer contains the monomer having the carboxyl group in an amount ranging from 1 mass % to 30 mass %.

11. The golf club grip according to claim 1, wherein the carboxyl-modified acrylonitrile-butadiene rubber contains a monomer having a carboxyl group in an amount ranging from 1.0 mass % to 8.0 mass %.

12. The golf club grip according to claim 1, wherein the carboxyl-modified acrylonitrile-butadiene rubber contains a monomer having a carboxyl group in an amount ranging from 3.5 mass % to 8.0 mass %.

13. The golf club grip according to claim 1, wherein the carboxyl-modified acrylonitrile-butadiene rubber contains acrylonitrile in an amount ranging from 26 mass % to 34 mass %.

14. A golf club comprising a shaft, a head provided on one end of the shaft, and a grip provided on another end of the shaft, wherein the grip is formed from a rubber composition comprising a base rubber and a crosslinking agent, and wherein the base rubber consists essentially of a hydrogenated acrylonitrile-butadiene rubber and/or a carboxyl-modified acrylonitrile-butadiene rubber; or
consists essentially of a hydrogenated acrylonitrile-butadiene rubber and/or a carboxyl-modified acrylonitrile-butadiene rubber, and at least one selected from the group consisting of an acrylonitrile-butadiene rubber, an isoprene rubber, a butadiene rubber, an ethylene-propylene-diene rubber, a chloroprene rubber, a butyl rubber, an acrylic rubber, a urethane rubber, an epichlorohydrin rubber, a polysulfide rubber and a natural rubber.

15. The golf club according to claim 14, wherein the hydrogenated acrylonitrile-butadiene rubber contains double bond in an amount ranging from 0.09 mmol/g to 2.5 mmol/g.

16. The golf club according to claim 15, wherein the hydrogenated acrylonitrile-butadiene rubber contains acrylonitrile in an amount ranging from 15 mass % to 50 mass %.

17. The golf club according to claim 14, wherein the rubber composition comprises a reinforcing material in a content ranging from 2.0 parts by mass to 50 parts by mass with respect to 100 parts by mass of the base rubber.

18. The golf club according to claim 17, wherein the reinforcing material is carbon black.

19. The golf club according to claim 14, wherein the rubber composition comprises at least one member selected from the group consisting of a metal oxide, a metal peroxide and a fatty acid as a vulcanization activator; and at least one member selected from the group consisting of a thiuram type vulcanization accelerator, a guanidine type vulcanization accelerator, a dithiocarbamate type vulcanization accelerator, a thiourea type vulcanization accelerator, a thiazole type vulcanization accelerator, and a sulfenamide type vulcanization accelerator as a vulcanization accelerator.

20. The golf club according to claim 14, wherein the hydrogenated acrylonitrile-butadiene rubber is a hydrogenated product of a copolymer of a monomer having a carboxyl group, acrylonitrile and butadiene, and
the copolymer contains the monomer having the carboxyl group in an amount ranging from 1 mass % to 30 mass %.

21. The golf club according to claim 14, wherein the carboxyl-modified acrylonitrile-butadiene rubber contains a monomer having a carboxyl group in an amount ranging from 1.0 mass % to 8.0 mass %.

22. The golf club according to claim 14, wherein the carboxyl-modified acrylonitrile-butadiene rubber contains acrylonitrile in an amount ranging from 26 mass % to 34 mass %.

* * * * *